(12) United States Patent
Luff

(10) Patent No.: US 6,987,816 B1
(45) Date of Patent: Jan. 17, 2006

(54) IRIS DATA RECOVERY ALGORITHMS

(75) Inventor: Gwilym Francis Luff, Great Shelford (GB)

(73) Assignee: Micro Linear Corporation, San Jose, CA (US)

( * ) Notice: Subject to any disclaimer, the term of this patent is extended or adjusted under 35 U.S.C. 154(b) by 712 days.

(21) Appl. No.: 09/715,556

(22) Filed: Nov. 17, 2000

Related U.S. Application Data

(60) Provisional application No. 60/167,430, filed on Nov. 23, 1999.

(51) Int. Cl.
*H04L 27/14* (2006.01)
*H04L 27/22* (2006.01)

(52) U.S. Cl. ............. 375/334; 375/316; 375/346
(58) Field of Classification Search ......... 375/316–352, 375/267, 76, 100; 455/182.1; 329/300–303, 329/318; 370/337, 347
See application file for complete search history.

(56) References Cited

U.S. PATENT DOCUMENTS

| | | | | |
|---|---|---|---|---|
| 4,029,904 A | * | 6/1977 | Papeschi | 375/318 |
| 4,141,209 A | | 2/1979 | Barnett et al. | 58/23 A |
| 4,350,957 A | | 9/1982 | Miyamoto | 329/107 |
| 4,723,318 A | | 2/1988 | Marshall | |
| 4,737,842 A | | 4/1988 | Nagasaki | 358/27 |
| 4,823,092 A | | 4/1989 | Pennock | |
| 4,873,702 A | * | 10/1989 | Chiu | 375/319 |
| 4,918,338 A | | 4/1990 | Wong | |
| 5,018,524 A | | 5/1991 | Gu et al. | 128/421 |
| 5,182,477 A | | 1/1993 | Yamasaki et al. | |
| 5,222,078 A | * | 6/1993 | Cason et al. | 375/319 |
| 5,245,565 A | | 9/1993 | Petersen et al. | 364/825 |
| 5,303,420 A | | 4/1994 | Jang | 455/343 |
| 5,345,190 A | | 9/1994 | Kaylor | |
| 5,353,307 A | | 10/1994 | Lester et al. | 375/14 |
| 5,379,457 A | | 1/1995 | Nguyen | 455/323 |
| 5,432,779 A | | 7/1995 | Shimo et al. | 370/30 |
| 5,491,447 A | | 2/1996 | Goetschel et al. | |
| 5,497,123 A | | 3/1996 | Main et al. | 330/257 |
| 5,633,896 A | | 5/1997 | Carlin et al. | 375/340 |
| 5,663,989 A | * | 9/1997 | Fobbester | 375/344 |
| 5,680,072 A | | 10/1997 | Vulih et al. | |

(Continued)

FOREIGN PATENT DOCUMENTS

| | | |
|---|---|---|
| EP | 0 344 852 A1 | 12/1989 |
| EP | 0 584 870 A1 | 8/1993 |
| EP | 0 576 082 A1 | 12/1993 |
| EP | 0 660 504 A1 | 6/1995 |
| EP | 0 723 335 A1 | 7/1996 |
| EP | 0 833 482 A2 | 4/1998 |
| EP | 0 853 374 A1 | 7/1998 |
| EP | 0 948 129 A1 | 10/1999 |
| GB | 2330 279 A | 4/1999 |

OTHER PUBLICATIONS

Hidehiko Kuroda et al., "Development of Low Power Consumption RF/IF Single–Chip Transceiver IC for PHS," Doc. No. XP000832839, pp. 161–167, Compound Semiconductor Device Division, NEC IC Microcomputer Systems, Ltd.
Angel Boveda et al., "GaAs Monolithic Single–Chip Transceiver," Doc. No. XP–000538492, pp. 31–34, IEEE, May 15, 1995.

*Primary Examiner*—Chieh M. Fan
*Assistant Examiner*—Jason M. Perilla
(74) *Attorney, Agent, or Firm*—Haverstock & Owens LLP

(57) ABSTRACT

A data recovery algorithm for implementation in a radio transmitter or receiver that includes a direct current level setting circuit with a preamble detector which will establish a threshold for a simplified decision simplified equalizer slicer that improves receiver performance in a feedback manner by utilizing an analog comparator, a one symbol long one bit resolution delay line and a summing junction.

28 Claims, 2 Drawing Sheets

U.S. PATENT DOCUMENTS

| | | | | |
|---|---|---|---|---|
| 5,734,294 A | | 3/1998 | Bezzam et al. | |
| 5,825,257 A | | 10/1998 | Klymyshyn et al. | 332/100 |
| 5,826,182 A | | 10/1998 | Gilbert | 455/326 |
| 5,886,547 A | | 3/1999 | Durec et al. | 327/113 |
| 5,890,051 A | | 3/1999 | Schlang et al. | 455/76 |
| 5,894,496 A | | 4/1999 | Jones | 455/126 |
| 5,903,820 A | | 5/1999 | Hagstrom | 455/82 |
| 5,920,810 A | | 7/1999 | Finol et al. | 455/313 |
| 5,936,474 A | | 8/1999 | Rousselin | 331/34 |
| 5,937,335 A | | 8/1999 | Park et al. | 455/86 |
| 5,953,640 A | | 9/1999 | Meador et al. | |
| 5,960,046 A | * | 9/1999 | Morris et al. | 375/347 |
| 5,966,666 A | | 10/1999 | Yamaguchi et al. | 455/552 |
| 5,999,804 A | | 12/1999 | Forgues | 455/333 |
| 6,040,731 A | | 3/2000 | Chen et al. | 327/359 |
| 6,060,935 A | | 5/2000 | Shulman | |
| 6,118,811 A | | 9/2000 | Narumi et al. | 375/219 |
| 6,127,884 A | | 10/2000 | Rishi | 329/304 |
| 6,226,276 B1 | | 5/2001 | Na | 370/294 |
| 6,256,511 B1 | | 7/2001 | Brown et al. | 455/552 |
| 6,275,101 B1 | | 8/2001 | Underhill | 327/551 |
| 6,308,058 B1 | | 10/2001 | Souetinov et al. | 455/326 |
| 6,343,207 B1 | | 1/2002 | Hessel et al. | 455/86 |
| 6,370,205 B1 | * | 4/2002 | Lindoff et al. | 375/319 |
| 6,480,553 B1 | | 11/2002 | Ho et al. | 375/272 |
| 6,484,014 B1 | | 11/2002 | Koszarsky | 455/86 |
| 6,516,186 B1 | | 2/2003 | Yamagishi et al. | 455/302 |

* cited by examiner

IRIS DATA RECOVERY ALGORITHMS

RELATED APPLICATIONS

This application claims priority under 35 U.S.C. § 119(e) of the co-pending U.S. provisional application Ser. No. 60/167,430 filed on Nov. 23, 1999 and entitled "IRIS DATA RECOVERY ALGORITHMS," is also hereby incorporated by reference.

FIELD OF THE INVENTION

The present invention relates to the field of radio transmitters and receivers. More particularly, the present invention relates to the field of data recovery algorithms implemented in a radio transmitter or receiver circuit.

BACKGROUND OF THE INVENTION

Due to the rapid growth in the area of digital cordless telephony, cordless telephones are fast becoming more than merely home appliances. Recent developments in cordless telephone technology such as phones that support higher data rate and sophisticated applications such as wireless private branch exchanges have made it necessary to develop a digital cordless standard.

One of the first such standards was the Digital European Cordless Telecommunications (DECT) system. DECT is designed as a flexible interface to provide cost-effective communications services to high user densities in small cells. This standard is intended for applications such as domestic cordless telephony, telepoint and radio local loop. It supports multiple bearer channels for speech and data transmission, hand over, location registration and paging. DECT is based on time division duplex and time division multiple access. Gaussian filtered FSK (GFSK) modulation scheme is employed in DECT. GFSK is a premodulation Gaussian filtered digital FM scheme. In order to comply with the standards set out by DECT, a data recovery algorithm must be implemented in the receiver circuit of a cordless telephone. This data recovery algorithm is used in certain applications including a transmitter and a receiver such as a cordless phone where an error may occur when the frequency of the transmitter does not match the expected frequency of the receiver. This frequency shift will turn into a DC shift in the analog waveform, making the data difficult to receive and read.

Existing data recovery algorithms utilize a traditional decision feedback equalizer (DFE) or data slicer which includes both feedforward and feedback paths. Consequently, these type of DFEs require either an analog to digital converter (ADC) and a digital signal processor (DSP) or some analog delay mechanism in order to achieve the desired output. Additionally, traditional applications will utilize an integrating capacitor to acquire the DC level of the incoming signal during the preamble portion of the input signal.

The reference frequency accuracy specifications for DECT allow for a frequency error of up to 100 KHz between two radios. To allow for this error, as well as any residual error in the discriminator's center frequency, an adaptive data slicer threshold is needed. Most DECT radios use a first order linear feedback loop to set up a slicing threshold. The loop is activated during preamble and the synchronization word (sync word), but then the loop is opened once the sync word is detected by the baseband processing and the slice level held on the off-chip capacitor for the remainder of the data packet. There is a trade-off between the initial acquisition and sensitivity to the data pattern. There are only 32 bits available to set up the DC level, including 16 bits of preamble and 16 bits of sync word, which requires a fairly short time constant. However, the sync word is followed by arbitrary data in a field which carries medium access control information. In the few bits processing delay while the baseband recognizes the sync word, the slice level can become corrupted. Traditional circuits suffer quite badly from this process because the tight post detection filtering decreases the amplitude of the preamble relative to the long '1' or '0' sequences.

FIG. 1 is a block schematic diagram of an existing DFE circuit 10 or data slicer. In this circuit 10, an input signal 22 which has been filtered by a Gaussian filter is input to a comparator 12 along with a feedback signal 14. An output signal 26 is coupled with a switch 16 which is operated by a switch control signal 24. When the switch 16 is closed, the output signal is coupled with a coupling resistor 18 and a slicing capacitor 20 which are coupled together in series and grounded 28.

In addition to the aforementioned problems associated with traditional DFE circuits, a user of a radio or phone including a traditional data slicer circuit will oftentimes run into other problems. For instance, the traditional circuit does not exhibit a satisfactory sensitivity or range. Also, traditional data slicer circuits require additional circuitry to operate properly, adding to the complexity and cost of the circuit.

SUMMARY OF THE INVENTION

A circuit with a preamble detector, a DC level set portion and a data slicer is configured to receive an input signal including a preamble portion, a unique word portion and a data portion. Additionally, the circuit is configured to receive a control signal and provide an output signal.

The preamble detector receives the input signal and provides a preamble signal which is active during the preamble portion of the input signal and inactive during the unique word and data portions of the input signal.

The DC level set circuit receives the input signal, the control signal and the preamble signal from the preamble detector. The DC level set circuit derives a level set signal output using a pair of summers, a comparator, a functional AND gate and an integrating capacitor coupled in parallel with a current source for charging or discharging the integrating capacitor. This level set signal is then outputted to the data slicer.

The data slicer uses a feedback path including a comparator, a delay line and a summer to provide the output signal of the circuit.

DETAILED DESCRIPTION OF A PREFERRED EMBODIMENT

Figure 1:
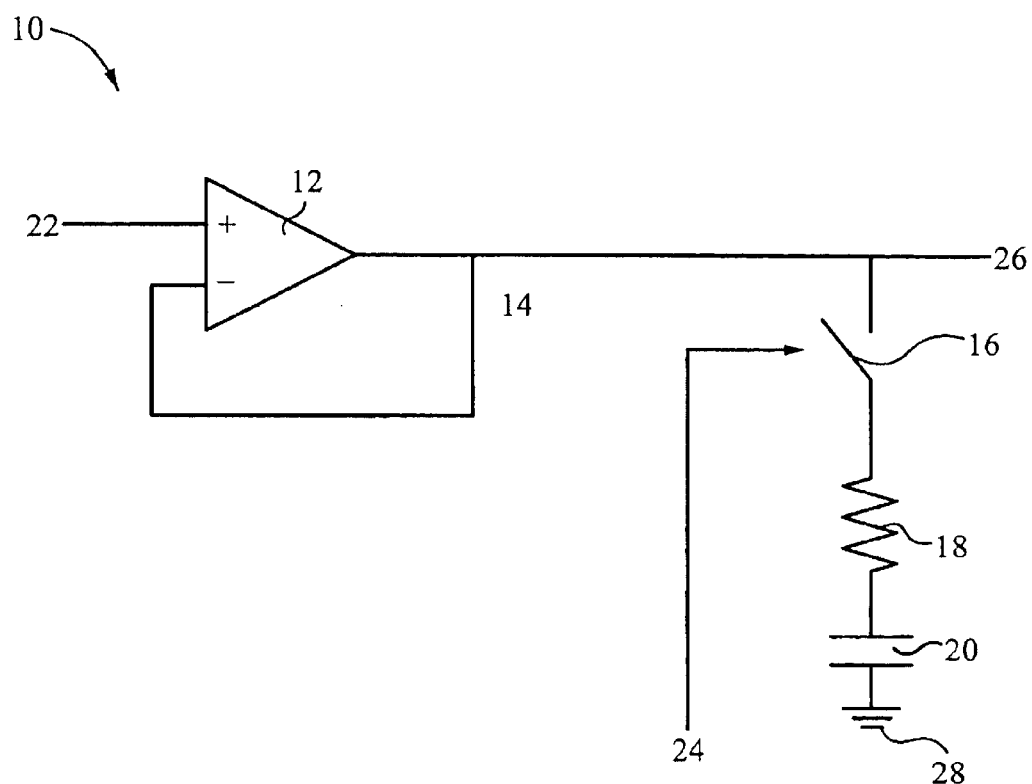
FIG. 1 illustrates a block schematic diagram of a decision feedback equalizer of the prior art.
Figure 2:
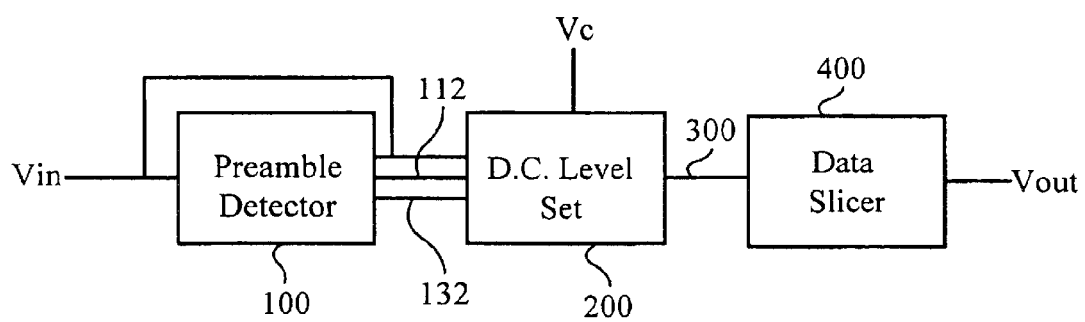
FIG. 2 illustrates a block schematic diagram of the preferred embodiment of the present invention.

A block schematic diagram of the preferred embodiment of the Iris Data Recovery Algorithm is depicted in FIG. 2. A preamble detector circuit 100 receives an input signal $V_{IN}$ and outputs an active preamble signal 112. A DC level set circuit 200 receives the same input signal $V_{IN}$ along with the preamble signal 112, a delay output 132 and a control signal $V_C$. The DC level set circuit 200 outputs a level set signal 300 to a data slicer circuit 400. The data slicer circuit 400 provides an output signal $V_{OUT}$.

Figure 3:
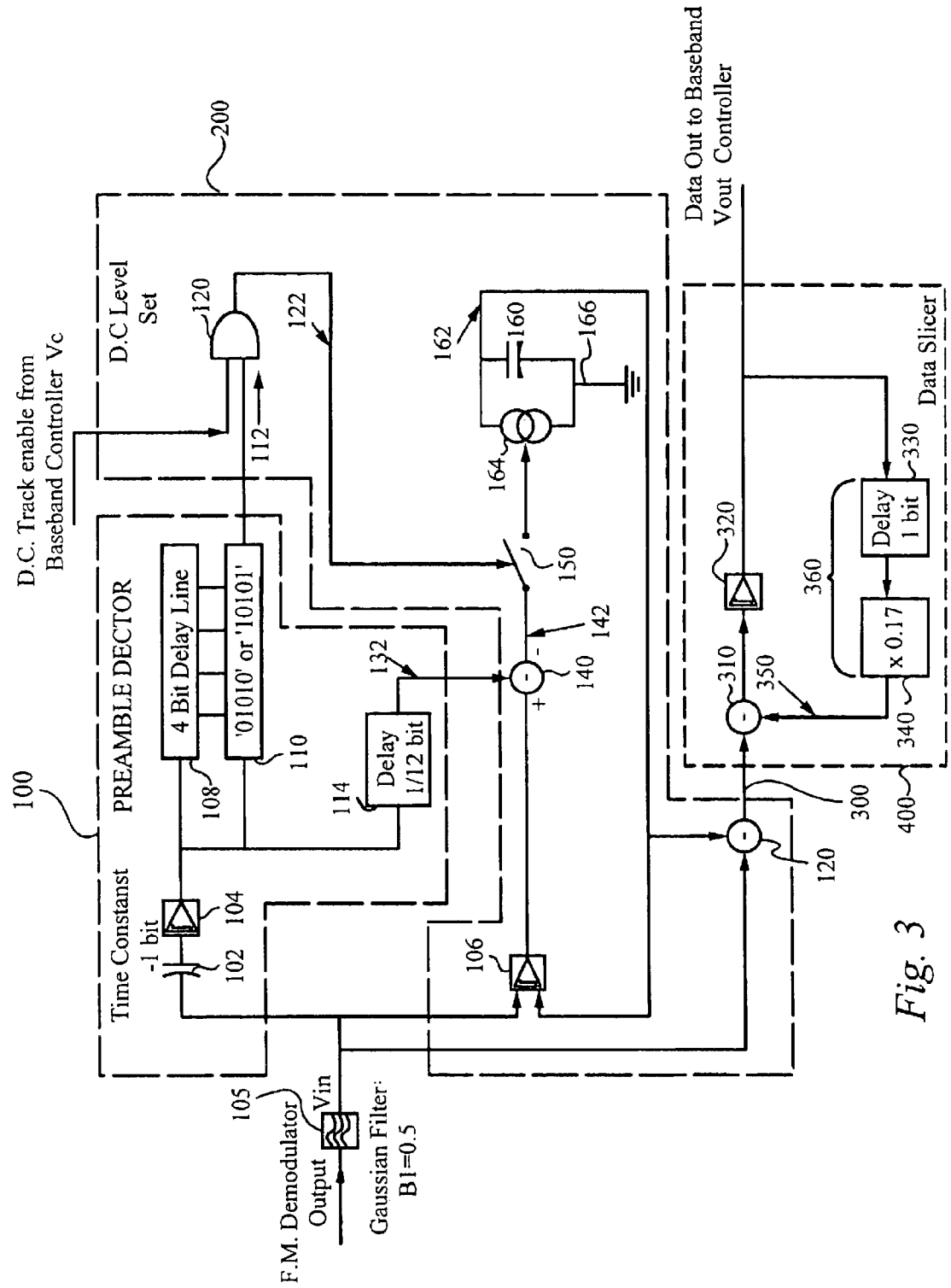
FIG. 3 illustrates a schematic diagram of the preferred embodiment of the present invention.

A schematic diagram of the this preferred embodiment of the Iris Data Recovery Algorithm is depicted in FIG. 3. This figure provides a more detailed depiction of the operation of the preferred embodiment of the present invention. An incoming communications signal such as an FM Demodulator output is received and routed to a gaussian filter 105. The gaussian filter 105 utilized in the preferred embodiment can be a standard function used readily in the industry. The filtered output of the gaussian filter 105 is the input signal $V_{IN}$ to the present invention. The filtered input signal $V_{IN}$ is input to both the preamble detector circuit 100 and the DC level set circuit 200.

In the preamble detector circuit 100, the filtered input signal $V_{IN}$ is input to an AC coupling circuit 102. The AC coupling circuit 102 removes DC offset from the input signal $V_{IN}$ and inputs the signal into a comparator 104 which recovers the digital output from the signal. The output of the comparator 104 is then input to a 4-bit delay line 108, a preamble detector 110 and a delay element 114. The 4-bit delay line 108 will hold a 4-bit sequence of the incoming signal before outputting it to the preamble detector 110. When the preamble detector 110 senses a preamble portion of the signal "01010" or "10101", it provides an active preamble signal 112 to the DC level set circuit 200, indicating the presence of a preamble portion in the signal. The delay element 114 delays the signal from the comparator 104 to compensate for phase advance caused by the AC coupling 102 before also outputting a delay output 132 to the DC level setting circuit 200. In the preferred embodiment, the delay is set to one twelfth of one bit.

In a wireless system comprising wireless communication between two digital devices, an error occurs when the frequency of the transmitter does not match the frequency expected in the receiver. This error can result in a DC shift in the analog waveform. The preferred embodiment of the present invention includes the DC level set circuit 200 in both the transmitter and the receiver to reduce or eliminate the error in the analog waveform.

The DC level set circuit 200 of the preferred embodiment of the present invention includes an AND gate 120 that receives both the preamble signal 112 from the preamble detector circuit 100 and a control voltage signal $V_C$. The AND gate 120 outputs a control signal 122 that closes the switch 150 when both the control signal $V_C$ and the preamble signal 112 are active. The DC level set circuit 200 also includes a comparator 106 that compares the input signal $V_{IN}$ with a stored value 162 of an integrating capacitor 160. The integrating capacitor 160 is charged or discharged by a current source 164. The current source 164 will charge or discharge the integrating capacitor 160 depending on a charge signal 142 output by a first summer 140 when the switch 150 is closed. The first summer 140 adds the output of the comparator 106 to the delay output 132 from the delay element 114 of the preamble detector circuit 100. Further, the charge signal 142 is directly proportional to the output of the comparator 106. Therefore, when the stored value 162 is less than the input signal $V_{IN}$, the charge signal 142 causes the current source 164 to charge the integrating capacitor 160. When the stored value 162 is more than the input signal $V_{IN}$, the charge signal 142 causes the current source 164 to discharge the integrating capacitor 160. The integrating capacitor 160 is also coupled with a ground terminal 166.

Also in the DC level set circuit of the preferred embodiment of the present invention, the stored value 162 is added to the input signal $V_{IN}$ in a second summer 120. The output of the second summer 120 is the level set signal 300, that is in turn, inputted to the data slicer circuit 400.

The preferred embodiment of the data slicer circuit 400 is also depicted in FIG. 3. The data slicer circuit receives the level set signal 300 in a third summer 310. The third summer 310 subtracts a scaled feedback signal 350 from the level set signal 300. The output of the third summer 310 is input to a third comparator 310 that recovers the digital output from the signal and outputs in turn the final output signal $V_{OUT}$.

The output signal $V_{OUT}$ is also fed to a feedback block 360. The feedback block 360 includes a delay element 330 and a scaling element 340. In the preferred embodiment, the delay element 330 delays the signal by one bit duration and the scaling element 340 scales the signal by 0.17. The output of the scaling element 340 is the feedback signal 350, which is input to the third summer 310.

Lastly, in the preferred embodiment of the present invention, the input signal $V_{IN}$ comprises a preamble portion, a unique word portion and a data packet portion. In alternate embodiments of the present invention, specifically in applications where the DECT standard applies, the input signal comprises a preamble portion, a unique word portion, a medium access control (MAC) and a data packet portion. In other standards, the MAC portion may be substituted for some similar type of control data. This control data is typically used to communicate to the receiver information describing the forthcoming data packet.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. In a wireless receiver, a circuit for receiving an input signal from a transmitter, the input signal including a preamble portion, a unique word portion and a data portion, the circuit comprising:
   a. a preamble detector configured to receive the input signal and to provide a preamble signal where the preamble signal is active during the preamble portion of the input signal and inactive during all portions of the input signal other than the preamble portion;
   b. a DC level set circuit configured to receive the preamble signal, the input signal including the preamble portion, the unique word portion and the data portion and to receive a control signal and to provide a level set signal; and
   c. a data slicer circuit coupled with the DC level set circuit to receive the level set signal and to provide an output signal; wherein the preamble detector comprises:
      i. an AC coupling for removing a direct current offset from the input signal;
      ii. a first comparator for recovering a digital output from the AC coupling;

iii. a four bit delay line for detecting and for holding the preamble portion of the input signal;

iv. a lower block coupled with both the four bit delay line and the first comparator for providing the preamble signal when the four bit delay line detects the preamble portion of the input signal; and v. a delay element for receiving the input signal and for providing a delay signal to the DC level set circuit.

2. The preamble detector of claim 1 wherein the lower block outputs an active output to the DC level set circuit.

3. The preamble detector of claim 1 wherein the delay element delays the input signal one-twelfth of one bit.

4. The circuit of claim 1 wherein the DC level setting circuit comprises:

a. a functional AND gate for receiving the preamble signal and the control signal and outputting a switch signal when both the control signal and the preamble signals are active;

b. an integrating capacitor coupled in parallel with a current source for charging or discharging the integrating capacitor;

c. a second comparator for comparing the input signal to an output from the integrating capacitor and for outputting a charge signal;

d. a first summer for adding the delay signal from the preamble detector to the charge signal of the second comparator;

e. a switch for providing an electrical connection from the first summer to the current source; and f. a second summer for adding the output of the integrating capacitor with the input signal and for outputting the level set signal to the data slicer.

5. The DC level setting circuit of claim 4 wherein when the charge of the integrating capacitor is less than the input signal, the charge signal causes the current source to charge the integrating capacitor.

6. The DC level setting circuit of claim 4 wherein when the charge of the integrating capacitor is more than the input signal, the charge signal causes the current source to discharge the integrating capacitor.

7. The DC level setting circuit of claim 4 wherein the switch closes when the functional AND gate outputs the switch signal, and opens when the switch signal is not outputted by the functional AND gate.

8. The circuit of claim 1 wherein the data slicer circuit comprises:

a. an analog comparator;

b. a one bit resolution delay line; and c. a third summer.

9. The data slicer circuit of claim 8 wherein a third summer is configured to receive the level set signal from the DC level set circuit.

10. The data slicer circuit of claim 8 wherein the third summer subtracts a scaled feedback signal from the level set signal.

11. The data slicer circuit of claim 8 wherein the analog comparator is configured to receive an output of the third summer and to produce the output signal.

12. The data slicer circuit of claim 8 wherein the one bit resolution delay line is configured to receive the output signal as a feedback signal.

13. The data slicer circuit of claim 8 wherein the one bit resolution delay line outputs a scaled feedback signal.

14. A method of receiving an input signal and a control signal and providing an output signal, the input signal including a preamble portion, a unique word portion and a data portion, the method comprising the steps of:

a. receiving the input signal with a preamble detector;

b. providing a preamble signal where the preamble signal is active during the preamble portion of the input signal and inactive during all portions of the input signal other than the preamble portion;

c. receiving the preamble signal from the preamble detector, the input signal, and the control signal with a DC level set circuit;

d. providing a level set signal with the DC level set circuit;

e. receiving the level set signal from the DC level set circuit with a data slicer circuit, and f. providing the output signal with the data slicer circuit, wherein the preamble detector provides the preamble signal according to the steps of:

i. AC coupling the input signal;

ii. comparing a digital output from the AC coupling;

iii. holding the preamble portion of the input signal in a four bit delay line;

iv. providing the preamble signal when the four bit delay line detects the preamble portion of the input signal;

v. providing a delay signal to the DC level set circuit.

15. The method of claim 14 wherein the data slicer circuit provides the output signal by:

$$d_k = x_k - 0.17 d_{k-m}$$

where $d_k$ is the current Output, $X_k$ is the current input and $d_{k-m}$ is the previous bit decision.

16. A circuit for receiving an input signal and a control signal and providing an output signal, the input signal including a preamble portion, a unique word portion and a data portion, the circuit comprising:

a. means for receiving the input signal with a preamble detector;

b. means for providing a preamble signal where the preamble signal is active during the preamble portion of the input signal and inactive during all portions of the input signal other than the preamble portion;

c. means for receiving the preamble signal from the preamble detector, the input signal and the control signal with a DC level set circuit;

d. means for providing a level set signal with the DC level set circuit;

e. means for receiving the level set signal from the DC level set circuit with a data slicer circuit; and f. means for providing the output signal with the data slicer circuit; and wherein the preamble detector comprises:

i. an AC coupling for removing a direct current offset from the input signal;

ii. a first comparator for recovering a digital output from the AC coupling:

iii. a four bit delay line for detecting and for holding the preamble portion of the input signal;

iv. a lower block coupled with both the four bit delay line and the first comparator for providing the preamble signal when the four bit delay line detects the preamble portion of the input signal; and v. a delay element for receiving the input signal and for providing a delay signal output to the DC level set circuit.

17. The preamble detector of claim 16 wherein the lower block outputs an active output to the DC level set circuit.

18. The preamble detector of claim 16 wherein the delay element delays the input signal one-twelfth of one bit.

19. The circuit of claim 16 wherein the DC level setting circuit comprises:
  a. a functional AND gate for receiving the preamble signal and the control signal and outputting a switch signal when both the control signal and the preamble signals are active;
  b. an integrating capacitor coupled in parallel with a current source for charging or discharging the integrating capacitor;
  c. a second comparator for comparing the input signal to an output from the integrating capacitor and for outputting a charge signal;
  d. a first summer for adding the delay signal from the preamble detector to the charge signal of the second comparator;
  e. a switch for providing an electrical connection from the first summer to the current source; and
  f. a second summer for adding the output of the integrating capacitor with the input signal and for outputting the level set signal to the data slicer.

20. The DC level setting circuit of claim 19 wherein when the charge of the integrating capacitor is less than the input signal, the charge signal causes the current source to charge the integrating capacitor.

21. The DC level setting circuit of claim 19 wherein when the charge of the integrating capacitor is more than the input signal, the charge signal causes the current source to discharge the integrating capacitor.

22. The DC level setting circuit of claim 19 wherein the switch closes when the functional AND gate outputs the switch signal, and opens when the switch signal is not outputted by the functional AND gate.

23. The circuit of claim 16 wherein the data slicer circuit comprises:
  a. an analog comparator;
  b. a one bit resolution delay line; and
  c. a third summer.

24. The data slicer circuit of claim 23 wherein a third summer is configured to receive the level set signal from the DC level set circuit.

25. The data slicer circuit of claim 23 wherein the third summer subtracts a scaled feedback signal from the level set signal.

26. The data slicer circuit of claim 23 wherein the analog comparator is configured to receive an output of the third summer and to produce the output signal.

27. The data slicer circuit of claim 23 wherein the one bit resolution delay line is configured to receive the output signal as a feedback signal.

28. The data slicer circuit of claim 23 wherein the one bit resolution delay line outputs a scaled feedback signal.

* * * * *